(12) United States Patent
Nobayashi et al.

(10) Patent No.: US 7,874,392 B2
(45) Date of Patent: Jan. 25, 2011

(54) EXCAVATING MACHINE

(75) Inventors: Takafumi Nobayashi, Chikugo (JP); Yasuyuki Oyamada, Chikugo (JP); Takahiro Ikeda, Chikugo (JP); Keiichi Nishihara, Chikugo (JP); Masao Nagata, Chikugo (JP); Saizou Kondou, Chikugo (JP); Masami Miyanishi, Chikugo (JP)

(73) Assignee: Yanmar Co., Ltd., Osaka (JP)

( * ) Notice: Subject to any disclaimer, the term of this patent is extended or adjusted under 35 U.S.C. 154(b) by 184 days.

(21) Appl. No.: 12/282,852

(22) PCT Filed: Aug. 25, 2006

(86) PCT No.: PCT/JP2006/316716

§ 371 (c)(1),
(2), (4) Date: Oct. 8, 2008

(87) PCT Pub. No.: WO2007/105324

PCT Pub. Date: Sep. 20, 2007

(65) Prior Publication Data

US 2009/0084003 A1    Apr. 2, 2009

(30) Foreign Application Priority Data

Mar. 13, 2006    (JP) .............................. 2006-067815

(51) Int. Cl.
*B62D 25/10* (2006.01)
(52) U.S. Cl. ................................................. 180/89.17
(58) Field of Classification Search .............. 180/89.13, 180/89.17, 89.18, 326, 327; 296/190.01, 296/190.08, 90.01
See application file for complete search history.

(56) References Cited

U.S. PATENT DOCUMENTS

| 6,058,903 A | * | 5/2000 | Downham | ............... | 123/198 E |
| 6,206,122 B1 | * | 3/2001 | Boothman et al. | ........ | 180/89.17 |
| 6,615,942 B2 | * | 9/2003 | Shinohara et al. | ......... | 180/69.21 |

FOREIGN PATENT DOCUMENTS

| EP | 0 727 529 A1 | 8/1996 |
| JP | 57-22474 | 2/1982 |
| JP | 2000-096614 | 4/2000 |
| JP | 2000-257114 | 9/2000 |
| JP | 2003-020680 | 1/2003 |
| JP | 2004-150029 | 5/2004 |
| JP | 2005-48380 | 2/2005 |

\* cited by examiner

*Primary Examiner*—Paul N Dickson
*Assistant Examiner*—Robert A Coker
(74) *Attorney, Agent, or Firm*—Sterne, Kessler, Goldstein & Fox P.L.L.C.

(57) ABSTRACT

It is an object of the present invention to provide a cover for a power shovel which can be manufactured at a low cost by reducing the number of parts and production man-hours and can be improved in maintainability. In the power shovel 50 which include an upper revolution structure (10) having: a body frame (11), a seat support stand (13) disposed at the rear of the body frame (11) and covering an upper part of the engine, and a device frame (12) disposed on a front part of the body frame (11) and storing hydraulic devices, side and a rear parts of the seat support stand (13) and the side part between the device frame (12) and the body frame (11) are covered by left and right side-covers (14) and (15) and a rear cover (16).

4 Claims, 7 Drawing Sheets

(a)

(b)

EXCAVATING MACHINE

BACKGROUND OF THE INVENTION

1. Field of the Invention

The present invention relates to technique for a structure of a cover covering an upper revolution structure in an excavating machine represented by a power shovel or the like.

2. Background Art

Well known as an excavating machine capable of excavating and loading soil and sand is a power shovel. Typically, the power shovel generates hydraulic pressure with a hydraulic pump driven by a diesel engine and makes all movements involved in traveling and operation. Moreover, as a travel device, a crawler travel device is frequently used. A basic structure of the power shovel is based on a lower traveling structure capable of self-traveling and an upper revolution structure capable of rotating thereon through 360 degrees. When the upper revolution structure is oriented in a travel direction, a driver seat and a working device are disposed in front of the upper revolution structure and a power source such as an engine is disposed at the rear thereof.

Typically, a configuration of the upper revolution structure of the power shovel is a configuration such that the engine, a radiator, and a hydraulic pump are placed on a rear part of a body frame and hydraulic devices, etc. are placed at a front part of the body frame. For example, Patent Document 1 discloses a power shovel which is based on this configuration and to which a working machine pivoting bracket is selectively fitted.

[Patent Document 1] Japanese Unexamined Patent Publication No. 2000-257114

BRIEF SUMMARY OF THE INVENTION

Problem to be Solved by the Invention

However, with such typical configuration of the upper revolution structure, the engine and the hydraulic devices are disposed in a narrow space, and thus it has conventionally been difficult to perform maintenance operations on the engine and the hydraulic devices. Further, a typical configuration includes five or more covers that cover the engine and the hydraulic devices (for example, left and right covers of a frame, left and right covers and a rear cover of a hood), and high part costs have been spent at the time of production due to a large number of parts. Furthermore, it has required great time and labor for an operation of fixing while making position adjustment so as to minimize a space between the covers at the time of production. Wasting the part costs and the production costs means wasting the production costs.

Thus, an object to be achieved is to provide a cover for a power shovel which can be manufactured at a low cost by reducing the number of parts and production man-hours and can be improved in maintainability.

Means Adapted to Solve the Problems

The object to be achieved by the present invention is as described above, and means adapted to solve this object will be described next.

Specifically, the present invention refers to an excavating machine having an upper revolution structure including: a body frame; a seat support stand disposed at the rear of the body frame and covering an upper part of an engine; and a device frame disposed on a front part of the body frame and storing hydraulic devices, in which a rear cover is fitted onto a rear end of the body frame to cover the rear of the seat support stand and a pair of left and right side-covers are individually and respectively fitted onto both left and right side ends of the body frame, in which the left and right side-covers are formed of an integral member, respectively covering left and right sides of the seat support stand, left and right sides of the device frame, and left and right sides between the seat support stand and the device frame, and in which rear end parts of the both left and right side covers are bent toward a lateral center of a machine body at the rear of the seat support stand to form fixing parts to be fixed to the upper and lower revolution structures, and the fixing parts of the side-covers are superimposed on both left and right ends of the rear cover and are then fitted to the rear cover.

Moreover, the present invention refers to the excavating machine described above, in which the rear cover has a pivot support point provided at an upper part thereof and is located at substantially a same height position as a position of an upper end part of the seat support stand and has a bottom part thereof provided in a manner such as to extend to an upper part of the body frame, and the side-covers are provided in a manner such as to extend forward and obliquely downward from substantially the same height position as positions of both sides of the rear cover to both front sides of the body frame to be thereby structured to cover the engine and the hydraulic devices.

Further, the present invention refers to the excavating machine described above, in which the fixing parts are arranged inside the rear cover.

EFFECT OF THE INVENTION

The advantages of the present invention are as shown below.

In the present invention, a cover covering an upper revolution structure of an excavating machine is provided with a minimum number of covers that is structurally realizable, that is, three covers including left and right side-covers and a rear cover, thereby permitting reduction in the number of parts. Moreover, the reduction in the number of cover parts reduces an operation of fixing so as not to provide a space between the covers and thus can reduce production man-hours. That is, the reduction in the number of parts and the production man-hours can reduce the production costs. Further, a structurally maximum inner space can be opened by only removing one cover, thus permitting improvement in maintainability for an engine and hydraulic devices.

Moreover, in the present invention, a pivot support point is provided at an upper part of the rear cover; therefore, in addition to the above advantage, the entire engine disposed below the seat support stand is opened by pivoting and opening the rear cover, thus improving engine maintainability. Moreover, an engine side surface and the hydraulic devices are opened by opening the side-covers, thus improving maintainability of the engine and the hydraulic devices.

Further, in the present invention, the rear end parts of the side-covers are bent toward a lateral center of a machine body, fixing parts to be fixed to the upper revolution structure are formed, and the fixing parts are disposed inside the rear cover, whereby the rear cover is disposed on an outer side of the side-covers. Therefore, in addition to the above advantage, capability of opening the rear cover, which frequently opens, regardless of opening and closing of the side-covers, improves the engine maintainability. Moreover, when the rear cover is fitted, a fitting tool for fixing the fixing parts of the side-covers to the upper revolution structure is covered by the rear cover, thus improving the beauty. Further, an operation of fixing so as not to provide a space between the covers is not required, which permits reduction in the production man-hours.

DETAILED DESCRIPTION OF THE INVENTION

Next, the embodiment of the present invention will be described.

Figure 1:
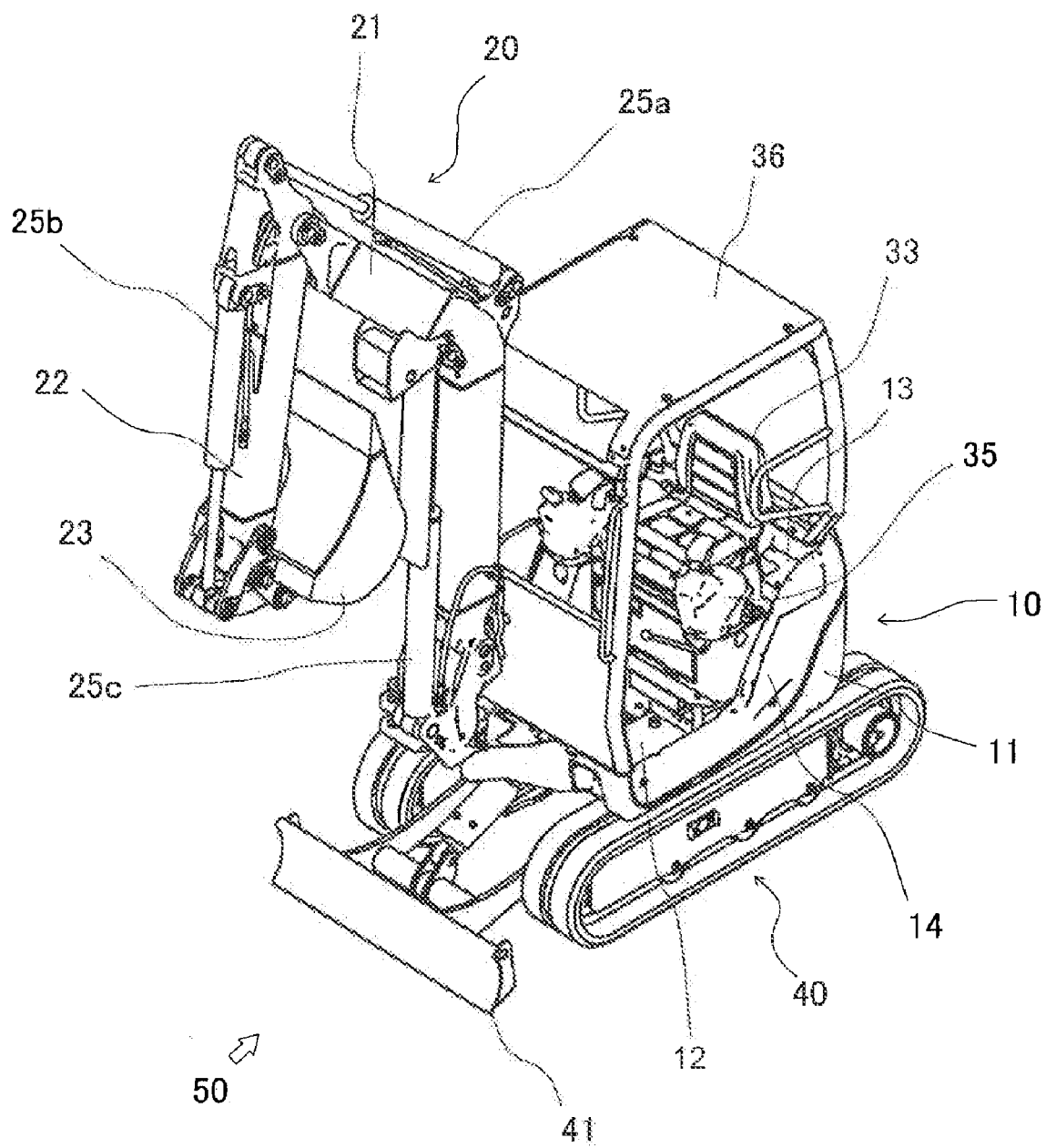
FIG. 1 is a perspective view showing an overall configuration of a power shovel according to an embodiment of the present invention.
Figure 2:
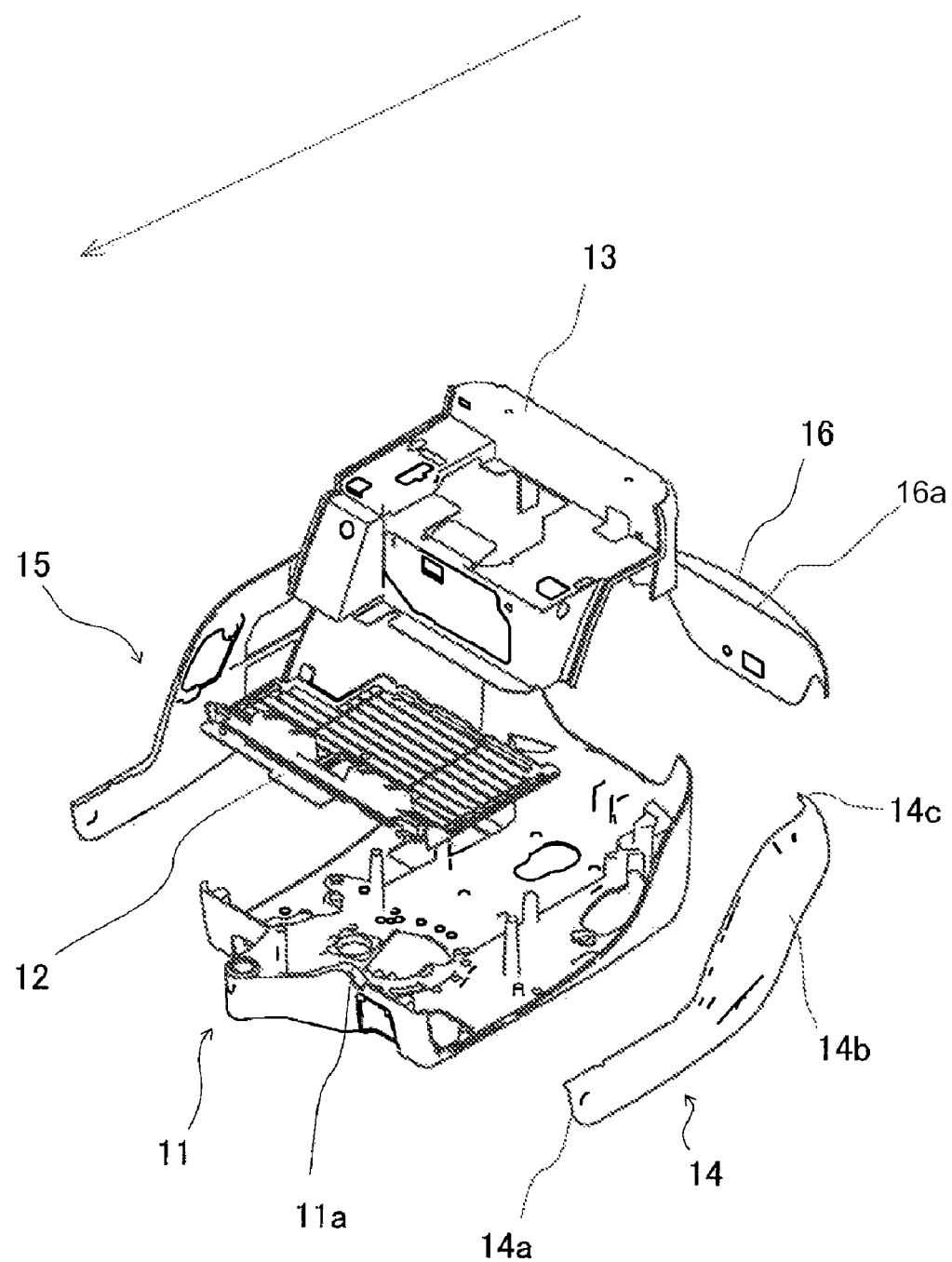
FIG. 2 is a perspective view showing components of an upper revolution structure of the same.
Figure 4:
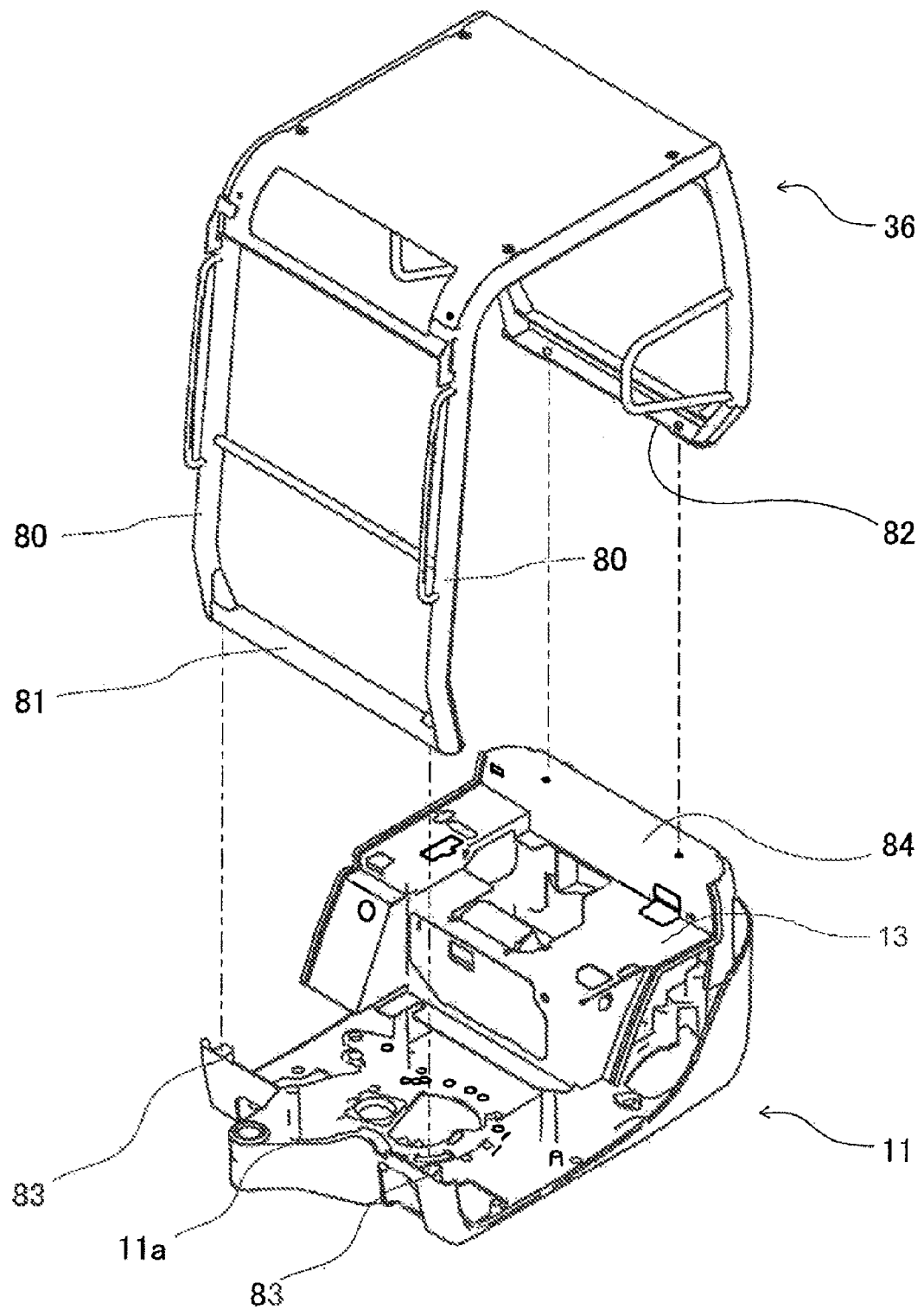
FIG. 4 is a perspective view showing fitting of a body frame to a canopy of the same.

FIG. 1 is a perspective view showing an overall configuration of a power shovel according to the embodiment of the present invention, FIG. 2 is a perspective view showing components of an upper revolution structure of the same, and FIG. 4 is a perspective view showing fitting of a vehicle body to a canopy of the same.

Figure 3:
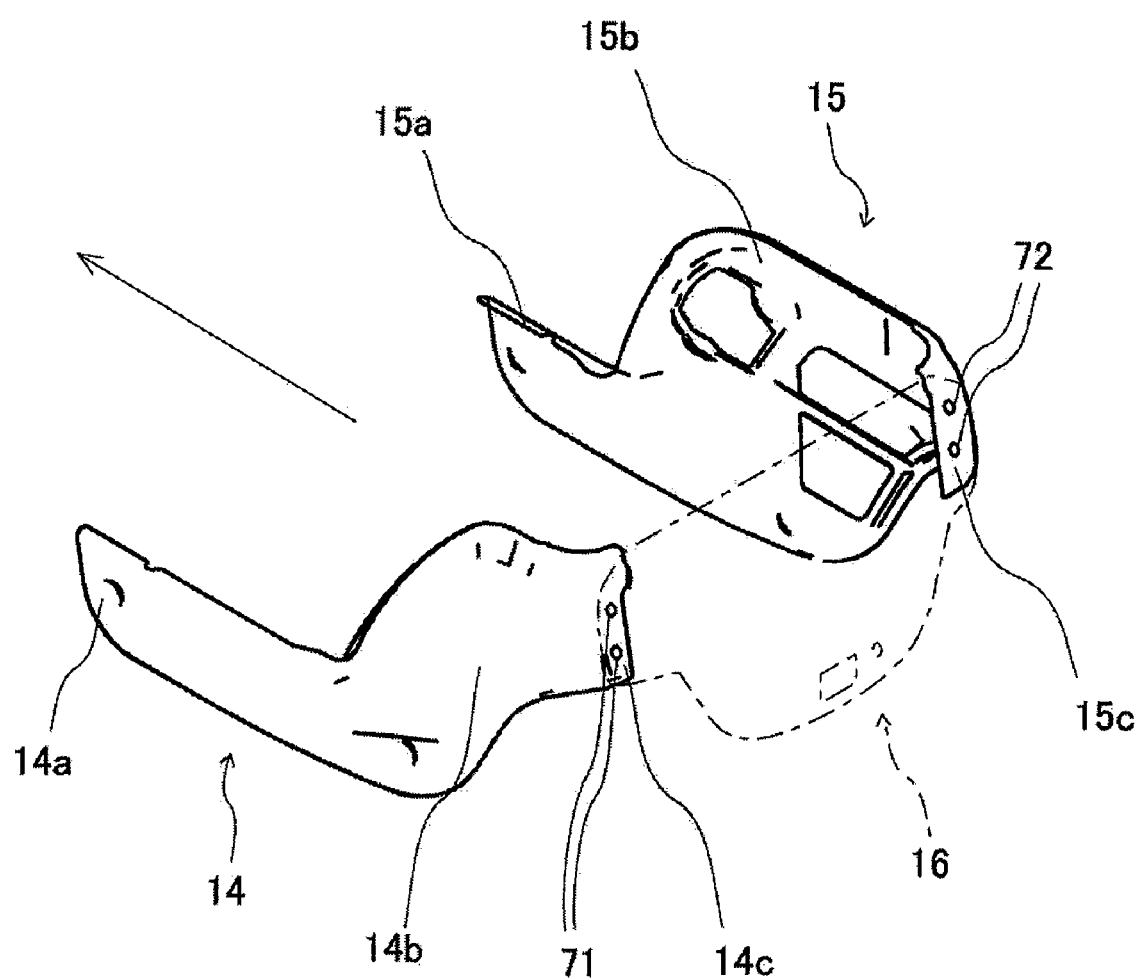
FIG. 3 is a perspective view showing a rear cover fitting configuration.
Figure 5:
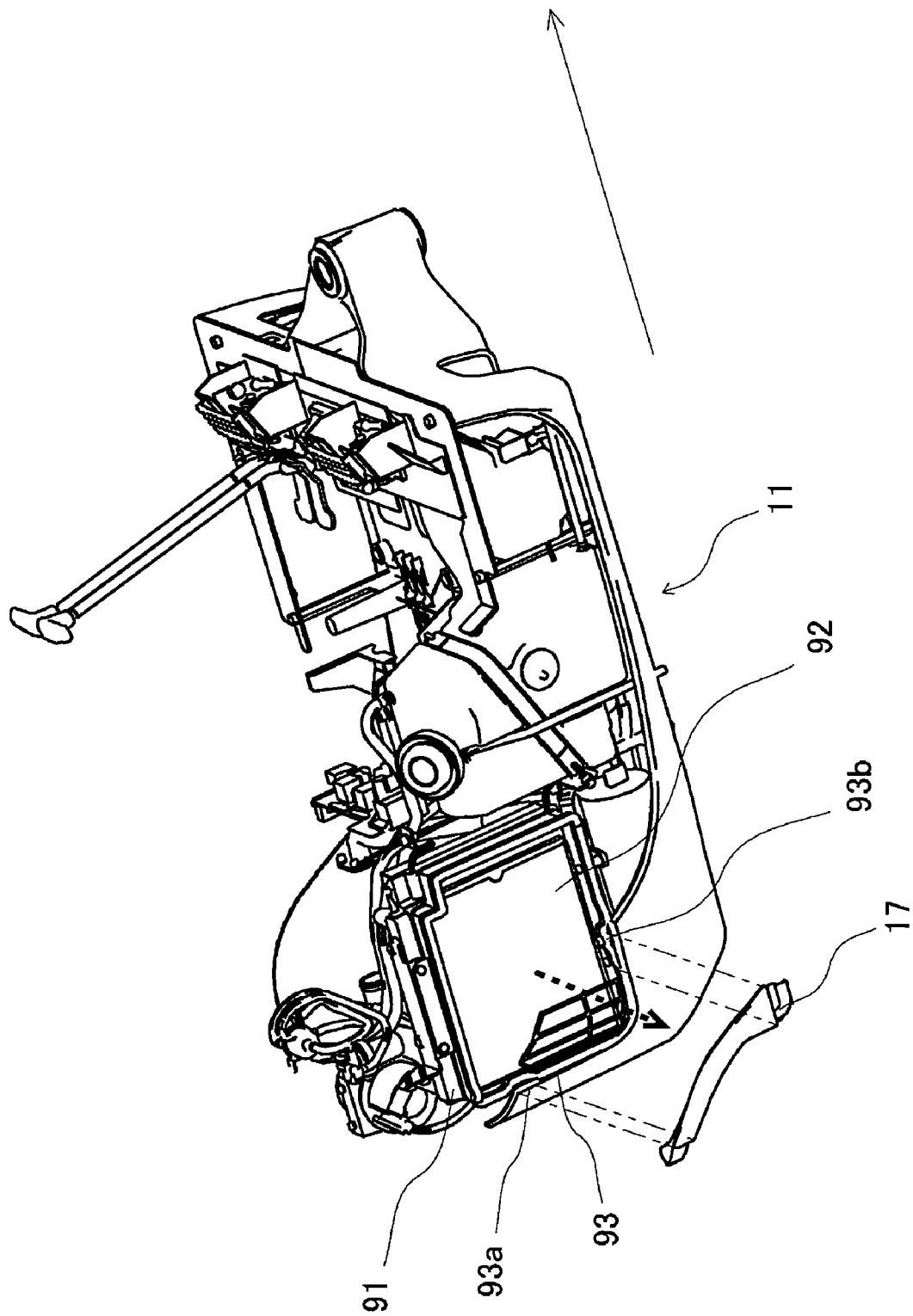
FIG. 5 is a perspective view showing another piece of the body frame covering an exhaust port of a radiator.
Figure 6:
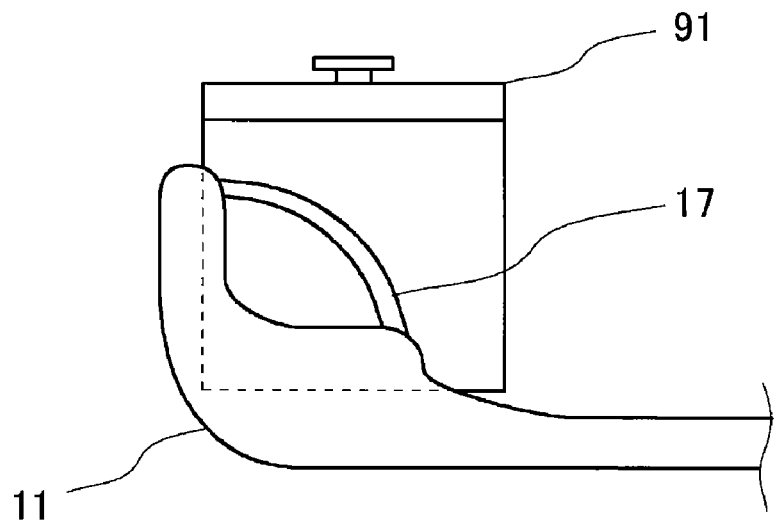
FIG. 6 (a) is a side view showing a condition in which another piece is fitted to the body frame, and FIG. 6 (b) is a perspective view and a sectional view taken along A-A' showing another piece as a separate unit.
Figure 6:
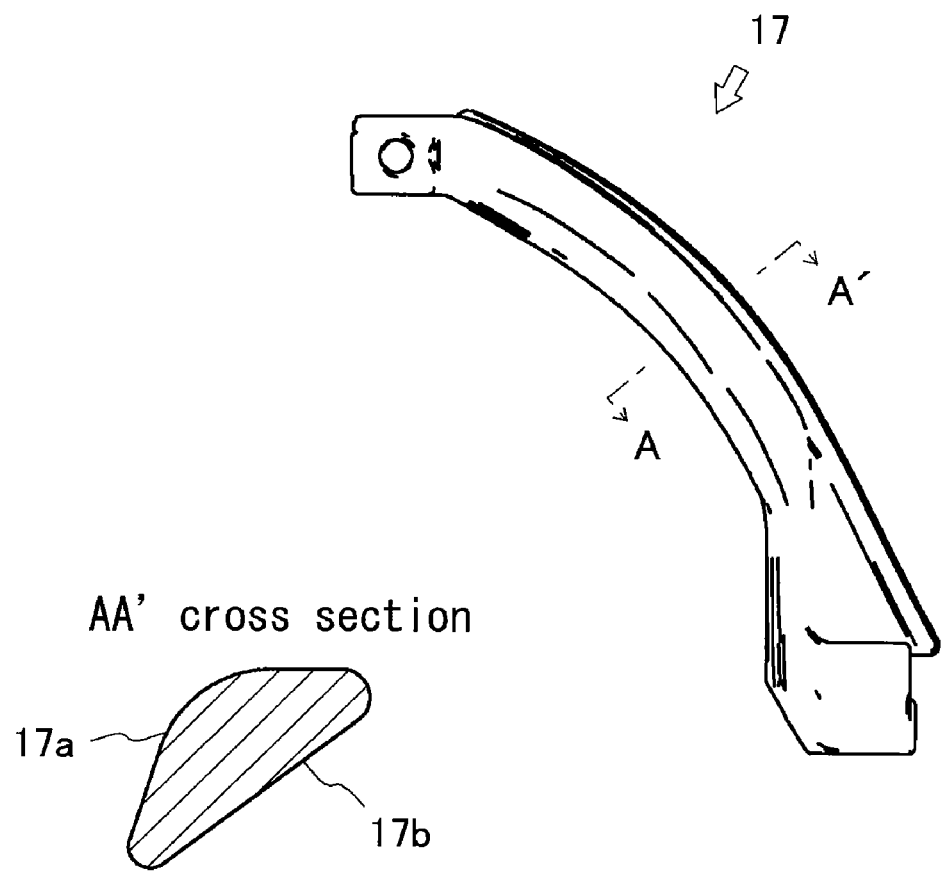
Figure 7:
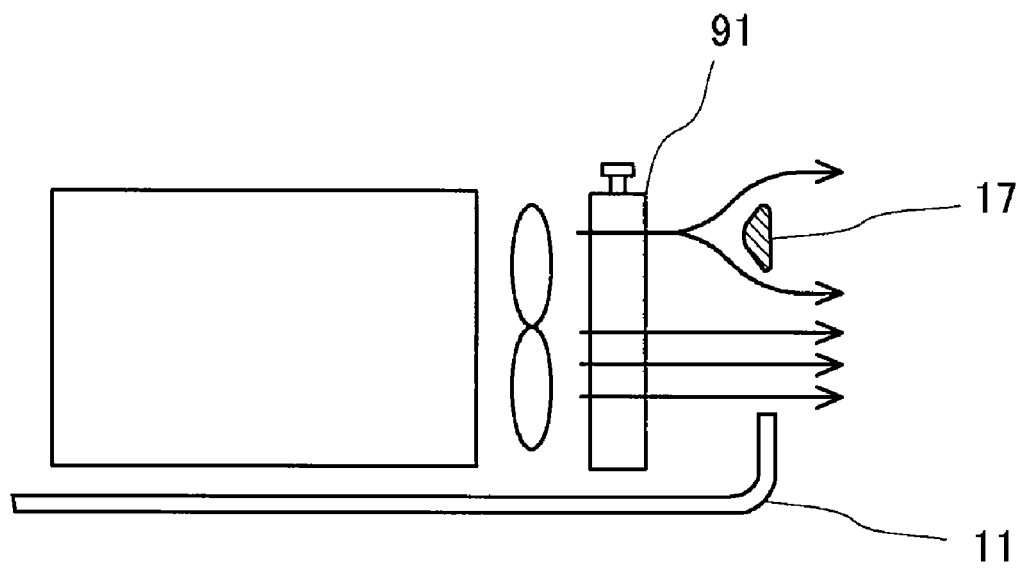
FIG. 7 is a schematic sectional view showing a flow of exhaust air from the radiator.

FIG. 3 is a perspective view showing a rear cover fitting configuration, FIG. 5 is a perspective view showing another piece of the vehicle body covering an exhaust port of a radiator, FIG. 6(a) is a side view showing a condition in which another piece is fitted to a body frame, and FIG. 6(b) is a perspective view and a sectional view taken along A-A' showing another piece as a separate unit. FIG. 7 is a schematic sectional view showing a flow of exhaust air from the radiator.

Note that a direction in which a driver seat 33 (see FIG. 1) is oriented forward is defined as a forward direction (a direction of an arrow in the figure).

As shown in FIG. 1, a power shovel 50 well-known as a construction machine is defined as an embodiment of the present invention. The power shovel 50 is a construction machine as an excavating machine for excavating soil and rock. This power shovel 50 is an excavating machine of a hydraulic shovel type, which is most frequently used and which is capable of performing operations such as loading mainly for the purpose of soil and sand excavating.

As shown in FIG. 1, an overall configuration of the power shovel 50 will be described briefly. The power shovel 50 roughly includes: a crawler travel device 40; an upper revolution structure 10 laterally rotatably supported on the upper center of the crawler travel device 40 in such a manner as to be capable of revolving laterally; and an operating machine 20 fitted to a lateral front center of the upper revolution structure 10.

The crawler travel device 40 has a blade 41 vertically pivotably arranged on either of front and rear sides thereof. This blade 41 is used for ground making accompanying excavating. The crawler travel device 40 may use crawlers with a variable gauge therebetween, so that an interval between the crawlers can be enlarged to ensure the safety during operation.

On the upper rear part of a body frame 11 of the upper revolution structure 10, an engine (not shown) is loaded, whose rear part is covered by a rear cover 16 (see FIG. 2) and the body frame 11 and whose both sides are covered by side-covers 14 and 15. Between the covers 14 and 15 and also above the engine, the driver seat 33 is disposed on a seat support stand 13 between the covers 14 and 15 and above the engine.

A driving operation part 35 is configured to have an operation lever, a lock lever, etc. disposed in front of or near the side part of the driver seat 33 and to have a pedal, etc. on a device frame 12 in front of the driver seat 33. Moreover, a canopy 36 is arranged above the driving operation part 35, or a cabin is arranged therearound.

The operating machine 20 roughly includes: a boom 21; an arm 22; and a basket 23. While these members are adapted to be pivotable by driving cylinders 25a, 25b, and 25c into expansion and contraction, an excavating operation, a loading operation, etc. are performed.

The upper revolution structure 10 according to the present invention will be described in detail, referring to FIG. 2. The upper revolution structure 10 roughly includes: the body frame 11; a device frame 12 serving as the step; the seat support stand 13; etc., and its sides and rear are covered by the side-covers 14 and 15 and the rear cover 16. For easier understanding, internal devices such as the engine, hydraulic devices, a revolving motor, etc., which are disposed inside, are not shown in FIG. 2.

The body frame 11 is formed through casting into a concave shape, whose rear part and both sides are formed thick to rise high upward to thereby form a counterweight, and whose front part is formed with a support part for fitting the operating machine (boom bracket). In the inner center of the body frame 11, an opening part for inserting a swivel joint, etc. therethrough is provided, and on front and rear parts thereof, supporting projections for fitting the device frame 12, etc. are so provided as to project upward: On the rear part of the opening part, a projection (mount) for fitting the engine, a hydraulic pump, a hydraulic oil tank, etc. is so provided as to project upward. In this way, the body frame 11 can be formed by casting into a complicated shape having a load-carrying portion which is widened or formed in another manner so as to ensure its strength.

The hydraulic devices (not shown), such as a control valve, a relief valve, etc., that switch driving of the operating machine 20 are stored in a space between the device frame 12 and the body frame 11, and a travel lever and a pedal for operating the hydraulic devices are arranged above the device frame 12.

The seat support stand 13 is provided above the engine placed at the rear part of the body frame 11. On an upper part of the seat support stand 13, the driver seat 33 is disposed, and in front of or near the side part of the driver seat 33, the operation lever, the lock lever, etc. are disposed.

The side-covers 14 and 15 and the rear cover 16 will be described in detail, referring to FIGS. 2 and 3.

The side-covers 14 and 15 are integrated covers, which extend forward and obliquely downward from their rear portions arranged at both sides of the rear cover 16 and at substantially the same height as that of both the sides of the rear cover 16 to their front portions at both front sides of the body frame 11, so as to cover the side surfaces of the upper revolution structure 10, thereby covering the engine and the hydraulic devices. Conventionally, covers covering the side parts between the device frame 12 and the aforementioned body frame 11 are different from covers covering the side parts between the seat support stand 13 and the body frame 11. That is, maintenance of the hydraulic devices and maintenance of the engine are performed by removing the respective different covers. However, each of the side-covers 14 and 15 according to the present invention is formed as the conventional front and rear covers integrated with each other.

The side-covers 14 and 15 bend in the form of "dog-leg" in the middle in the front-back direction, with front parts 14a and 15a formed horizontally and rear parts 14b and 15b so formed as to extend obliquely upward and rearward in a sloped manner. The side-covers 14 and 15 have respective rear end parts 14c and 15c each of which is formed into a shape that is bent in an L-shape in plan view toward the lateral center of the machine body. Then front ends of the front parts 14a and 15a are located at side parts of a rising part 11a, which is formed at the front end of the body frame 11, and are then fixed with bolts or the like. The rear parts 14b and 15b are so provided as to extend obliquely rearward and upward in accordance with a shape of the upper part of the counterweight part placed at the body frame 11, and their side lower parts are fixed to the body frame 11 with bolts or the like. The rear end parts 14c and 15c are located on an upper part of the counterweight part formed at the rear part of the body frame 11, and overlap with the left and right end parts of the rear cover 16, and are so disposed as to be located inside the rear cover 16 to form a structure covering the side parts of the upper revolution structure 10 from its front end to its rear end, and serve as fixing parts at the rear parts of the side-covers 14 and 15. Moreover, the side-covers 14 and 15 cover the side surfaces of the upper revolution structure 10 completely from its front end to its rear end to thereby protect the internal devices. To perform a maintenance operation in this manner, the side-covers 14 and 15 can be removed by removing the bolts or the like to easily perform the maintenance operation of the internal devices.

The rear cover 16 is an integral cover, which has an upper part with a pivot support point 16a located at substantially the same height position as that of the upper end part of the seat support stand 13 and which has a lower part extending to the upper part of the body frame 11, so as to cover the rear surface of the upper revolution structure 10. Specifically, the rear cover 16 is configured to be formed into a substantially reversed convex shape with the lower part formed into a shape in accordance with a concave shape of an upper part on the rear surface of the body frame 11 and with the both left and right sides overlapping the rear end parts 14c and 15c of the side-covers 14 and 15. Further, the rear cover 16 is configured so that when the rear cover 16 is fitted to the upper revolution structure 10 with the pivot support point 16a provided at the upper end part, a position of the aforementioned pivot support point 16a is adapted to be at substantially a same position as that of the upper end part of the seat support stand 13. Moreover, the rear cover 16 completely covers the rear surface of the upper revolution structure 10 to thereby protect the engine. Further, the rear cover 16 is formed in such a manner as to be openable and closable without any tool. Engine maintenance can be easily performed by opening and closing the rear cover 16.

In the present embodiment, the left and right side surfaces and the rear surface of the upper revolution structure 10 are covered with only the three covers 14, 15, and 16 which are a minimum-in-number structure. However, this structure does not lose an original function as covers having capability of being removed for the maintenance operation and protecting the internal devices by covering the opened surfaces (side surfaces and rear surface) defined by the body frame 11, the device frame 12, and the seat support stand 13.

Providing the structurally minimum number of the covers 14, 15, and 16 reduces the number of parts of the power shovel 50. Moreover, in comparison with a large number of covers of the conventional power shovel or the like having required much time and labor for fixing the covers so as to provide no space between the covers, minimizing the number of covers can reduce production and assembly man-hours. In this manner, the reduction of the number of parts of the power shovel 50 and the production man-hour can reduce the production costs.

Further, locating a position of the pivot support point 16a of the rear cover 16 at substantially the same position as that of the upper end part of the seat support stand 13 opens an entire rear surface of the engine, thus permitting an easy maintenance operation. Then, the side surface of the upper revolution structure 10 can open a structurally maximum internal space by only removing the single covers 14 and 15, thus permitting easy maintenance operation of the engine and the hydraulic devices.

Moreover, as shown in FIG. 3, in configurations of the side-covers 14 and 15 and the rear cover 16, the rear end parts of the side-covers 14 and 15 and the left and right side end parts of the rear cover 16 are so configured as to overlap each other in a manner such that the side-covers 14 and 15 structurally cover the rear cover 16. Moreover, the rear end parts 14c and 15c of the side-covers 14 and 15 are fixed to the seat support stand 13 with bolts 71 and 72 (see FIG. 2). Here, a position where the rear end parts 14c and 15c of the side-covers 14 and 15 are fixed, that is, a position where the bolts 71 and 72 are fitted is a portion where the side-covers 14 and 15 and the rear cover 16 overlap each other.

Usually, the rear cover 16 is opened and closed frequently in the maintenance operation; therefore, the rear cover 16 is so structured as to be capable of being opened and closed by the lock lever or the like without any tool. From this viewpoint, as a configuration of the present embodiment, there is no problem even as a structure that requires opening the rear cover 16 to remove the side-covers 14 and 15.

Here, the bolts 71 and 72 fixing the rear end parts 14c and 15c of the side-covers 14 and 15 are covered with the rear cover 16, thereby permitting the bolts 71 and 72 serving as fixing members to be hidden by the rear cover 16, which improves external design of the power shovel 50. Moreover, instead of a configuration such that covers are abutted against each other to be fixed, the configuration such that the side-covers 14 and 15 overlap the rear cover 16 so as to be covered with the rear cover 16 does not require a work for adjusting positions of the covers to be fixed so as to provide no space between the covers at the time of production, can reduce the production man-hours, does not require a high accuracy to be maintained, and can achieve cost reduction.

As shown in FIG. 4, a configuration of the canopy 36 is achieved by forming frames 80 in such a manner as to be bent into a gate shape in lateral view, forming the ceiling at an upper horizontal part, providing a support member 81 laterally at the front lower part of the frames 80, placing the both sides of the support member 81 at fixing parts 83 formed on the both sides of the rising part 11a of the aforementioned body frame 11 and fixing them with bolts or the like. Moreover, at the rear lower part of the frames 80, a support member 82 is provided laterally, and the support member 82 is fixed with bolts or the like to a rear surface 84 so formed as to rise perpendicularly at the rear end of the seat support stand 3. In this manner, the canopy 36 is so configured as to be capable of being fitted to the upper revolution structure 10. A fitting tool is typically a bolt or the like, although not limited thereto in the present embodiment. Moreover, the support members 81 and 82 are integrally formed.

In this manner, the power shovel 50 forms a structure with the body frame 11, the canopy 36, and the seat support stand 13, the body frame 11 and the front lower part of the canopy 36 are coupled and fixed together, the seat support stand 13 is fixed on the rear part of the body frame 11, and the rear lower part of the canopy 36 is fixed on the rear part of the seat support stand 13. Then between the front lower part of the seat support stand 13 and the rising part 11a, the device frame 12 is firmly provided as a step, and the lower side surface located on the outer side of the step and the side parts of the seat support stand 13 are covered by the side-covers 14 and 15.

In this manner, at the aforementioned canopy fitted part, the fitting is achieved with a simple configuration while maintaining strength. Providing a simple configuration for the canopy fitted part can reduce the number of parts of the power shovel 50, improves the canopy fitting accuracy at the time of production, and can reduce production man-hours. That is, with the simple configuration while maintaining the required rigidity, the production costs can be reduced by reducing the number of parts and the production man-hours.

As shown in FIG. 5, on one of the left and right sides of the body frame 11 where a radiator exhaust port is located, at a portion overlapping a radiator exhaust port 92 in side view, a notch 93 is provided, and a reinforcing member 17 coupling the open end side of the notch 93 is provided. Specifically, on the right rear side surface of the body frame 11, the notch 93 is provided at a portion where an outlet of the exhaust port (or suction port) 92 of the radiator 91 and the body frame 11 overlap each other in side view, and the both end parts of the notch 93 are coupled and fixed together by the reinforcing member 17. That is, on a side surface of the body frame 11 on the side where the exhaust port 92 of the radiator 91 is located, a portion overlapping the exhaust port 92 in lateral view is notched to form the notch 93. In the present embodiment, a notch in a triangular shape in side view is formed. Then at an open side end parts of the notch 93, fixing parts 93a and 93b are formed, and the bar-like reinforcing member 17 is laterally provided in such a manner as to function as a bridge between the fixing parts 93a and 93b. This bar-like reinforcing member 17 is, when in fitted condition, so formed as to almost match with the shape of the body frame 11 on the left side in side view. Then a space surrounded by this notch 93 and the reinforcing member 17 is so configured as to be covered by a net, a bar, or the like. In FIG. 5, a direction of an arrow of a broken line is an exhaust direction. Moreover, in FIG. 5, the reinforcing member 17 is separated from the body frame 11 for easier understanding. Further, as shown in FIGS. 2 and 3, an exhaust port opens at the rear part of the side-cover 15, and is so configured as to be covered by a net or the like.

The engine is required to cool a cylinder, a cylinder heat, etc. since a gas temperature inside the cylinder is high. The radiator 91 is a heat radiator for abandoning to the outside air heat drawn by cooling water that has cooled the engine. This radiator 91 is provided with a large number of fins to increase the area for heat exchange and thereby increase the amount of heat radiation, and is also provided with a fan to be driven by the engine.

On the other hand, the body frame 11, in order to maintain the structural strength, is so structured as to not only form a lower part of the upper revolution structure 10 but also partially cover the side surfaces, the front surface, or the rear surface. In the present embodiment, the body frame 11 is integrally structured in such a manner as to partially cover the rear side surface. With such structure, the exhaust port of the radiator 91 placed at the right rear of the body frame 11 is covered by the body frame 11.

Thus, in the body frame 11, a portion covering the exhaust port of the radiator 91 is notched, and the reinforcing member 17 is configured to be so fitted as to form an original contour of the notched portion for reinforcement. In the present embodiment, this reinforcing member 17 is so configured as to be fitted with bolts, although is not limited thereto.

In this manner, by reducing a surface covering the radiator exhaust port 92 while maintaining an original structural strength of the body frame 11, the heat radiation performance of the radiator 90 does not deteriorate. Moreover, the removal of the reinforcing member 17 can open the radiator exhaust port 92, thus permitting easy maintenance such as cleaning of the radiator exhaust port 92. Furthermore, when the power shovel 50 makes contact at its rear side surface during revolution of the upper revolution structure and thereby breaks the rear side surface of the body frame 11, repair can be performed by part replacement of only the reinforcing member 17, thus permitting reduction in the maintenance and repair costs.

FIG. 6(a) shows the reinforcing member 17 fitted to the body frame, and FIG. 6(b) shows a perspective view and an A-A cross section of this reinforcing member 17. As shown in FIGS. 6(a) and (b), an interior side surface 17a of the reinforcing member 17 is shaped so that its sectional shape is formed on a convex curve line. In the present embodiment, a shape of a streamline with increased curvature of a radiator side is provided, although the detailed shape is not specifically limited. Then the interior side surface 17b is in accordance with a shape of the outer surface of the body frame 11. In this manner, the outer appearance is improved.

As described above, providing the reinforcing member 17 as a member separate from the body frame 11 can provide freedom in designing the reinforcing member 17.

As shown in FIG. 7, considering this in the present embodiment, forming a cross section of the reinforcing member 17 into the shape of a droplet has reduced the exhaust resistance of the radiator 91. The shape of a streamline in the present embodiment is a simple shape but has the effect that detachment is small and air resistance is small in a fluid. Thus, exhaust air of the radiator passing through the reinforcing member 17 is exhausted while smoothly avoiding the reinforcing member 17 without any resistance (arrow in FIG. 7). In this manner, an exhaust of the radiator 91 can be smoothly performed, thereby improving the heat radiation performance.

INDUSTRIAL APPLICABILITY

Applied examples of the present invention include an excavating machine.

What is claimed is:

1. An excavating machine having an upper revolution structure comprising:

a body frame;

a seat support stand disposed at a rear of the body frame and covering an upper part of an engine; and a device frame disposed on a front part of the body frame and storing hydraulic devices, wherein a rear cover is fitted onto a rear end of the body frame to cover the rear of the seat support stand and a pair of left and right side-covers are individually and respectively fitted onto both left and right side ends of the body frame, wherein the left and right side-covers respectively cover left and right sides of the seat support stand, left and right sides of the device frame, and left and right sides between the seat support stand and the device frame, and wherein rear end parts of the both left and right side covers are bent toward a lateral center of a machine body at the rear of the seat support stand to form fixing parts to be fixed to the seat support stand, and the fixing parts of the side-covers are superimposed on both left and right ends of the rear cover.

2. The excavating machine according to claim 1, wherein the rear cover has a pivot support point provided at an upper part thereof and is located at substantially the same height position as a position of an upper end part of the seat support stand and has a bottom part thereof provided in a manner such as to extend to an upper part of the body frame, and the side-covers are provided in a manner such as to extend forward and obliquely downward from substantially the same height position as positions of both sides of the rear cover to both front sides of the body frame to be thereby structured to cover the engine and the hydraulic devices.

3. The excavating machine according to claim 2, wherein the fixing parts are arranged inside the rear cover.

4. The excavating machine according to claim 1, wherein the fixing parts are arranged inside the rear cover.

* * * * *